H. C. HART.
COMPOSITION OF MATTER FOR KNIFE HANDLES.
APPLICATION FILED JAN. 16, 1907. RENEWED DEC. 23, 1909.

948,727.

Patented Feb. 8, 1910.

Inventor
H. C. Hart

Witnesses

UNITED STATES PATENT OFFICE.

HUBERT C. HART, OF UNIONVILLE, CONNECTICUT.

COMPOSITION OF MATTER FOR KNIFE-HANDLES.

948,727.  Specification of Letters Patent.  Patented Feb. 8, 1910.

Application filed January 16, 1907, Serial No. 352,583. Renewed December 23, 1909. Serial No. 534,697.

*To all whom it may concern:*

Be it known that I, HUBERT C. HART, a citizen of the United States, residing at Unionville, in the county of Hartford and State of Connecticut, have invented certain new and useful Improvements in Composition of Matter for Knife-Handles, of which the following is a specification.

This invention relates to improvements in a composition of matter, designed primarily for knife handles, but may be used to advantage in other arts.

The object of the invention is to produce a composition of matter which will possess strength, and at the same time have sufficient elasticity to prevent of its being easily broken.

Other objects and advantages will be hereinafter referred to and particularly pointed out in the claims.

Figure 1:
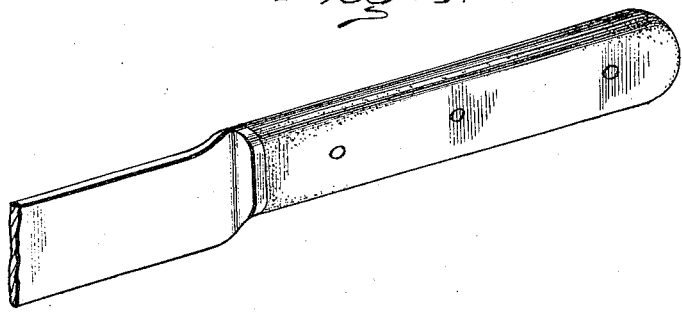
Figure 2:
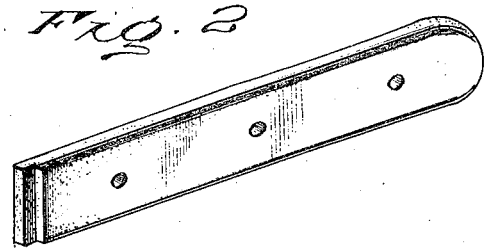

In the drawings I have shown the invention made in the form of a knife handle, and applied to a knife, Figure 1, being a perspective view. Fig. 2, is a detail view of one section of the handle.

In the production of my improved composition I employ, paper, rags and a solution of chlorid of zinc. The rags and paper are ground into comparatively small particles and with this mixture is added the solution of chlorid of zinc. The ground rags serve to toughen the composition, the fibers thereof being mixed with the chlorid which is in solution and affording means to cause the mass to congeal and hold together. I find that about seventy-five per cent. of rags, and about twenty-five per cent. of chlorid, will be sufficient to form a mass that will possess a durable and compact composition. A larger proportion of either the rags or chlorid will tend to weaken the resilient product. After a pulp is formed by the three elements enumerated, suitable coloring matter is added, according to the use, purpose and design desired.

The chlorid of zinc impregnates the particles of rags and paper and causes the mass to amalgamate. The pulp is now placed into a suitable press or mold and heated while pressure is applied. The heat and pressure ejects the moisture, at the same time causes the chlorid of zinc and rags and paper to congeal, producing a composition of matter similar to and having somewhat the characteristics of rubber.

Should a larger proportion of rags be added, it tends to make the composition brittle which would make it impracticable for use in connection with knife handles. This is also true with the chlorid. A larger proportion than specified appears to affect the congealing of the elements forming the composition.

What I claim is—

1. A composition of matter consisting of seventy-five per cent. of ground rags mixed with twenty five per cent. of chlorid of zinc, in solution and congealed.

2. A composition of matter consisting of seventy-five per cent. of ground rags and paper mixed with twenty five per cent. of chlorid of zinc in solution and congealed, the excess of liquid being expelled from the mass of material.

In testimony whereof I have signed my name to this specification in the presence of two subscribing witnesses.

HUBERT C. HART.

Witnesses:
JNO. IMIRIE,
FLOYD CORNWALL.